May 7, 1946.    H. FRAUENTHAL    2,399,669
BEARING
Filed Sept. 1, 1943    2 Sheets-Sheet 1

INVENTOR.
Harold Frauenthal
BY
Brown, Jackson, Boettcher Dienner
Attys.

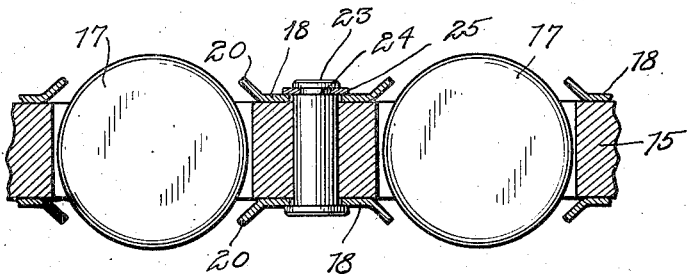
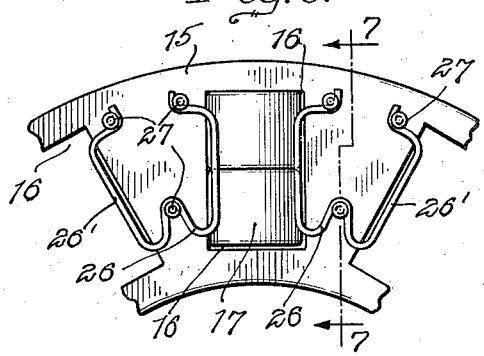
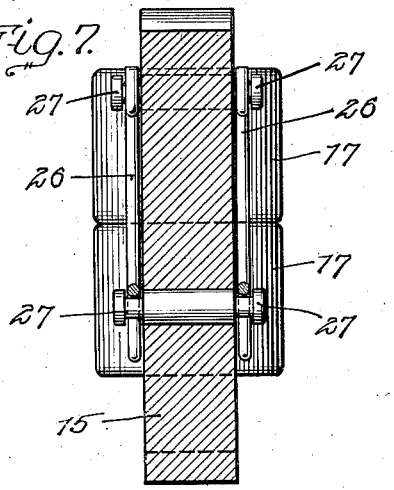
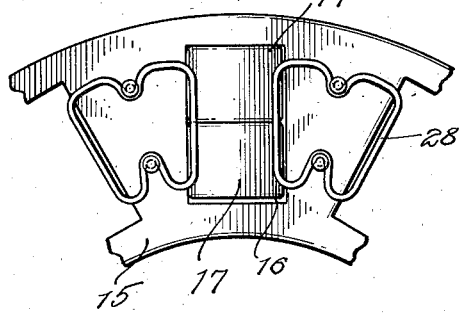
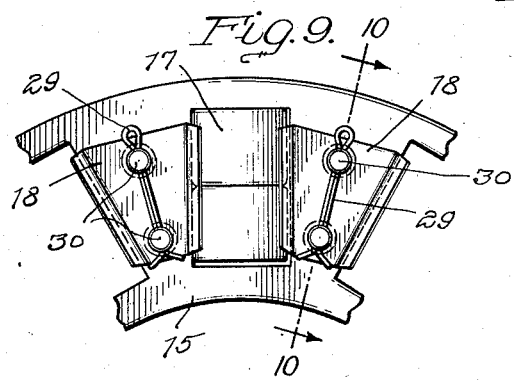
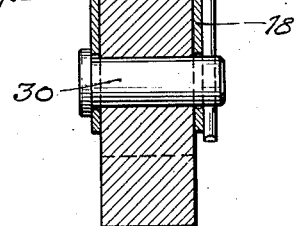

Patented May 7, 1946

2,399,669

UNITED STATES PATENT OFFICE 2,399,669

BEARING

Harold Frauenthal, Muskegon, Mich., assignor to The Kaydon Engineering Corporation, Muskegon, Mich., a corporation of Michigan Application September 1, 1943, Serial No. 500,767

12 Claims. (Cl. 308—235)

My invention relates to bearings, and particularly to thrust bearings of the straight cylindrical roller type.

Bearings of this character use retainer cages in the assembly to keep the rollers in proper position between the races during operation, and my invention is directed to certain improvements in such retainer cages, to the end of greater simplicity of structure, the use of non-metallic material for the main member, greater facility of insertion and removal of rollers, and more effective operation.

My invention is illustrated in the accompanying drawings in which—

Figure 5 is a sectional view, taken on the plane of the line 5—5 of Figure 4, and looking in the direction indicated by the arrows;

Figure 6 is a view, similar to Figures 2 and 4, showing another modification;

Figure 7 is a sectional view, taken on the plane of the line 7—7 of Figure 6, and looking in the direction indicated by the arrows;

Figure 8 is a view, similar to Figures 2, 4, and 6, showing another modification;

Figure 9 is a view, similar to Figures 2, 4, 6 and 8, showing another modification; and Figure 10 is a sectional view, taken on the plane of the line 10—10 of Figure 9, and looking in the direction indicated by the arrows.

Figure 1:
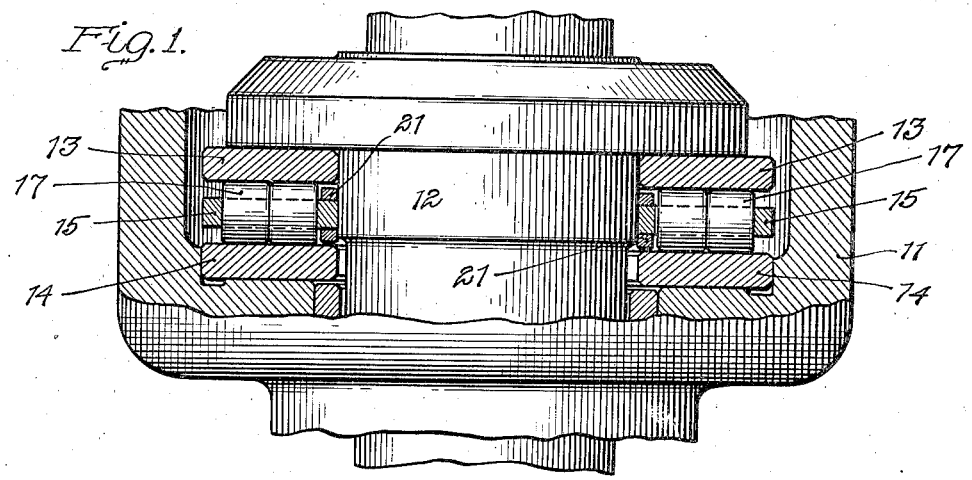
Figure 1 is an axial sectional view of a swivel bearing embodying the features of my invention.

Figure 1 is simply an example of a type of bearing to which my invention is adapted and need be only briefly described. A housing, receiving a rotating shaft, is shown at 11, the shaft being shown at 12. The usual annular flat races, employed in bearings of this kind, are shown at 13 and 14, respectively, the former being the race which moves with the shaft and the latter being the race which is stationary with the housing.

Figure 2:
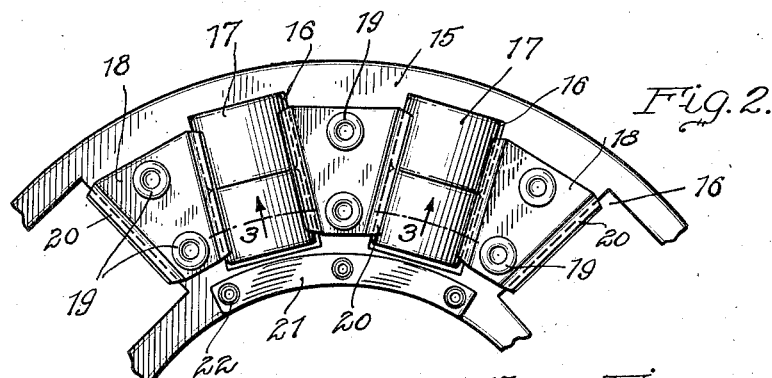
Figure 2 is a plan view of a portion of the retaining cage sub-assembly.
Figure 3:
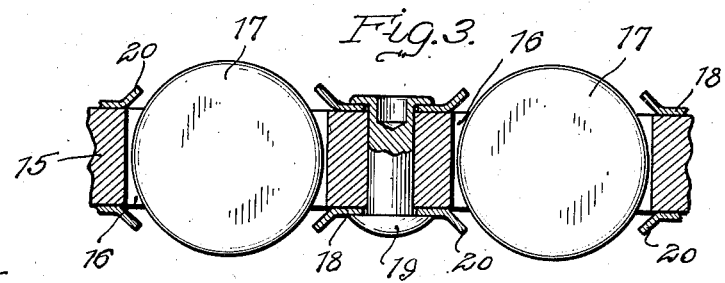
Figure 3 is a sectional view, taken on the plane of the line 3—3 of Figure 2, and looking in the direction indicated by the arrows.

The rollers and retainer cage, in which the features of my invention lie, form a sub-assembly disposed between the two races, as shown, and Figures 2 and 3 illustrate that sub-assembly, in its first form, in detail.

Referring to Figures 2 and 3, the reference characters of which are carried onto Figure 1 so far as applicable:

The main member of the retainer cage is a simple flat annulus 15, of substantial thickness, preferably of non-metallic light-weight material, such as the synthetic products now well known, for instance synthetic resin impregnated canvas formed under pressure, either molded or machined to shape, and this member is provided with rectangular openings 16, regularly spaced on radial axes, for the reception of the multi-part rollers 17, 17, these rollers fitting in these openings with a little play as indicated.

The rollers are kept in their respective openings by means of retainers 18, 18, of more-or-less trapezium shape and formed preferably of hard rolled steel, such as spring or shim stock. These retainers 18, 18 are secured to each side of the main member 15, between the openings 16, 16, by means of rivets 19, 19, as best illustrated in Figure 3, and their margins 20, 20, parallel to and overlapping the sides of the respective proximate openings, are bent outwardly, more-or-less to follow the cylindrical contour of the rollers. By this means the rollers are kept in their openings, however with considerable play through the main member, i. e. the said margins 20, 20 are considerably spaced from the rollers when the latter are in mid position, as shown.

It will be noted that the retainers 18, 18, are of such size that their margins 20, 20, fall considerably short of reaching the end or ends of the openings 16, 16, and, due to this fact and the fact that the material of the retainers has some resiliency, ready insertion of the rollers 17, 17 and their removal from the openings 16, 16 is permitted. Thus, disassembly and reassembly, for inspection and cleaning of the rollers, are greatly facilitated, entailing no removal of the retaining devices.

The diameter of the rollers is, of course, greater than the over-all width of the main member 15 and the parts secured thereto, and in order to position the cage centrally between the races 13 and 14, in final assembly, spacers 21, 21, are, by means of cement and rivets 22, 22, secured at the inner periphery of the member 15, on each side thereof, as illustrated in Figures 1 and 2. These spacers may conveniently be made of the same material as the main member 15, and are positioned at intervals around the periphery.

It is apparent that the cage structure, with the rollers therein, can readily be handled as a unit, the rollers being kept in their respective openings, and, in final assembly between the races, the rollers serve their purpose well spaced from the retainer clips so that there is no scraping of the lubricant from the rollers.

Figure 4:
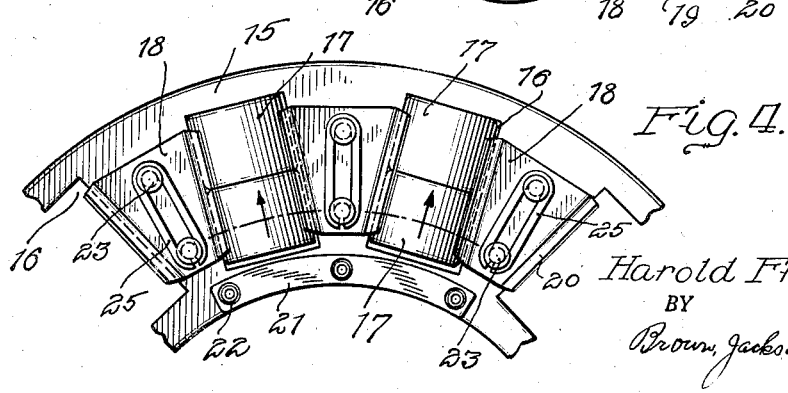
Figure 4 is a view, similar to Figure 2, showing a modification.

The form of device shown in Figures 4 and 5 differs from that shown in Figures 2 and 3 in the means by which the retainer clips 18, 18 are secured to the main member 15. In this instance headed pins 23, 23 are employed instead of the rivets 19, 19. These pins are provided at their ends with grooves 24, 24, for the reception of spring clips 25, as best shown in Figure 5, these clips serving, as will be evident from the drawings, to hold the retainers 18 in place.

Figures 6 and 7 show another type of retainer, illustrated at 26, this retainer being in the form of a spring wire, broadly of U-shape and tending to spread, hooked around three studs 27, 27 in such a way as to present a course 26' overlapping the adjacent opening 16 to perform the function previously described as performed by the margins 20, 20 of the retainers shown in the previous figures.

The form of device shown in Figure 8 is similar to that shown in Figures 6 and 7, except that the spring wire 28, instead of being in the form of a U, as in the case of the spring wire 26, is in the form of a complete loop; in this instance, but two studs are necessary for each wire.

The form of device illustrated in Figures 9 and 10 is similar to that shown in Figures 4 and 5, with the exception that cotters 29, 29, passing through apertures in the pins 30, 30 substituted for the pins 23, 23, are utilized, instead of the spring clips 25, 25, to complete the structure.

My invention, in its broader aspects, is adaptable to radial as well as thrust bearings, and some of the appended claims are drawn accordingly.

I claim:

1. In a bearing, a pair of races, rollers between said races, and a retaining cage for said rollers, said cage comprising a circular block of light material having planar surfaces parallel to said races and openings for receiving the rollers, and separate metal members having some resiliency secured to the faces of said block between next adjacent ones of said openings and overlapping the same to keep said rollers therein, said members being of a length less than that of said openings.

2. In a bearing, a pair of races, rollers between said races, and a retaining cage for said rollers, said cage comprising a circular block of non-metal composition having openings therein for receiving the rollers, and metal members of spring stock secured to the faces of said block between said openings and overlapping the same to keep said rollers therein, said members being secured to the faces of said block by headed pins passing therethrough and through the block and a spring clip engaging in grooves in the other end thereof.

3. In a bearing, a pair of races, rollers between said races, and a retaining cage for said rollers, said cage comprising a circular block of non-metal composition having openings therein for receiving the rollers, pins extending from the surface of said block, and a spring wire engaging and held by said pins and having courses overlapping adjacent openings to keep said rollers therein.

4. In a bearing, a retaining cage comprising an annulus of substantial thickness having therein openings for reception of anti-friction bearing members, anti-friction bearing members disposed in said openings projecting outward beyond said annulus, and separate resilient retaining members secured to said annulus between and individual to next adjacent ones of said openings overlapping the latter for retaining said anti-friction bearing members therein.

5. In a bearing, a retaining cage comprising an annulus of substantial thickness having therein openings for reception of anti-friction bearing members, anti-friction bearing members disposed in said openings projecting outward beyond said annulus, and separate resilient retaining members separately and removably mounted on said annulus between and individual to next adjacent ones of said openings overlapping the latter for retaining said anti-friction bearing members therein.

6. In a bearing, a retaining cage comprising an annulus of substantial thickness and of non-metal light weight material having therein openings for reception of anti-friction bearing members, anti-friction bearing members disposed in said openings, and resilient retaining members secured to said annulus and overlapping said openings for retaining said anti-friction bearing members therein, the portions of said retaining members overlapping said openings being disposed to be out of contact with said anti-friction bearing members in the normal operating positions of the latter in said openings.

7. In a bearing, a pair of races, anti-friction bearing members between said races, a retaining cage comprising an annulus of substantial thickness having therein openings receiving said members with the latter projecting outward beyond said annulus, and means for keeping said members in said openings comprising a plurality of individually removable retaining members separate from each other secured to one face of said annulus adjacent and overlapping the respective openings.

8. In a bearing, a pair of races, anti-friction bearing members between said races, a retaining cage comprising an annulus of substantial thickness having therein openings receiving said members with the latter projecting outward beyond said annulus, and means for keeping said members in said openings comprising a plurality of individually removable retaining members separate from each other secured to each face of said annulus adjacent and overlapping the respective openings.

9. In a bearing, a pair of races, anti-friction bearing members between said races, a retaining cage comprising an annulus of substantial thickness having therein openings receiving said members with the latter projecting outward beyond said annulus, and means for keeping said members in said openings comprising a plurality of individually removable retaining members separate from each other secured to one face of said annulus between and individual to next adjacent ones of said openings in overlapping relation thereto.

10. In a bearing, a pair of races, anti-friction bearing members between said races, a retaining cage comprising an annulus of substantial thickness having therein openings receiving said members with the latter projecting outward beyond said annulus, and means for keeping said members in said openings comprising a plurality of individually removable retaining members separate from each other secured to each face of said annulus between and individual to next adjacent ones of said openings in overlapping relation thereto.

11. In a retaining cage for anti-friction bearing members, an annulus of substantial thickness having therein openings for reception of anti-friction bearing members of such transverse dimension as to project outward beyond the opposite faces of said annulus, and means for retaining the bearing members in said openings comprising a plurality of individually removable retaining members separate from each other secured to one of said faces of said annulus adjacent and overlying the respective openings.

12. In a retaining cage for anti-friction bearing members, an annulus of substantial thickness having therein openings for reception of anti-friction bearing members of such transverse dimension as to project outward beyond the opposite faces of said annulus, and means for retaining the bearing members in said openings comprising a plurality of individually removable retaining members separate from each other secured to each of said faces of said annulus adjacent and overlying the respective openings.

HAROLD FRAUENTHAL.